United States Patent [19]

Sabbioni

[11] Patent Number: 4,530,626
[45] Date of Patent: Jul. 23, 1985

[54] GEAR CUTTER

[75] Inventor: Cesare Sabbioni, Bologna, Italy

[73] Assignee: CIMA S.p.A., Italy

[21] Appl. No.: 477,737

[22] Filed: Mar. 22, 1983

[30] Foreign Application Priority Data

Jun. 28, 1982 [IT] Italy .................................. 3464 A/82

[51] Int. Cl.$^3$ ............................................ B23F 23/10
[52] U.S. Cl. ................................... 409/10; 409/135
[58] Field of Search ................ 409/15, 135, 147, 186, 409/193, 148, 194, 207, 208, 210, 10, 11, 1.1; 408/4, 8, 10, 13, 16, 234; 82/DIG. 1

[56] References Cited

U.S. PATENT DOCUMENTS

| | | | |
|---|---|---|---|
| 3,113,488 | 12/1963 | Davenport | 409/15 |
| 3,521,526 | 7/1970 | Olig et al. | 409/135 |
| 4,100,837 | 7/1978 | Köhler | 408/16 X |
| 4,354,404 | 10/1982 | Ramusino | 408/13 X |

FOREIGN PATENT DOCUMENTS

| | | | |
|---|---|---|---|
| 146410 | 2/1981 | Fed. Rep. of Germany | 82/DIG. 1 |
| 178625 | 11/1982 | Japan | 409/193 |
| 807109 | 1/1959 | United Kingdom | 409/15 |
| 959095 | 5/1964 | United Kingdom | 409/193 |
| 1133225 | 11/1968 | United Kingdom | 82/DIG. 1 |
| 1269999 | 4/1972 | United Kingdom | 409/186 |

Primary Examiner—William R. Briggs
Attorney, Agent, or Firm—Darby & Darby

[57] ABSTRACT

Disclosed herein is a gear cutter that comprises a bedplate, a first block or column mounted on the bedplate, designed to carry a tool, and a second block or column also mounted on the bedplate, designed to carry in an axis of rotation a piece to be cut, and wherein provision is made for a device for detecting variations, due to the thermal expansion of the bedplate, in the distance the first block is apart from the second block, and for drive means interlocked to the said detection device and connected to at least one of the said blocks in order to compensate continuously for variations in the spacing in between the said blocks.

7 Claims, 2 Drawing Figures

GEAR CUTTER

BACKGROUND OF THE INVENTION

The invention relates to a gear cutter, and more precisely to a gear cutter provided with a device for automatically correcting errors occasioned by the thermal expansion of the bedplate of the machine.

DESCRIPTION OF THE PRIOR ART

In the description that folows reference will be made in particular to the gear cutters known as hobbers although what is about to be said can be taken as being applicable also to gear cutters of other types such as those known as circular tool and straight tool machines.

As is known, a hobber comprises a virtually parallelepiped bedplate that supports, placed in alignment one with respect to the other in the direction of the maximum extension of the machine, a block or column, this too virtually parallelepiped, and a rotary table.

The said block, which is supported by the said bedplate in a way in which it is able to slide, is provided in the position facing the rotary table with a plate or slide which, in turn, is vertically smooth running. The said slide supports the spindle around which the tool known as the hob, rotates entrusted with the task of cutting a piece carried in rotation around a vertical shaft, supported by the said rotary table.

It is known practice that in a machine of the aforementioned type, the area of interaction between the tool and the piece destined to be transformed into a gear has overhead a nozzle from which issues a constant jet of cutting oil with which to lubricate and cool the parts undergoing motion and also to remove the swarf.

In the most modern hobbers, the very high speeds reached by the rotating parts and the running of the machine without a break, as a consequence of the automatic charging of the pieces to be cut, result in the overheating both of the mechanical parts and of the cutting oil which, mixed with swarf, runs onto the area of the bedplate in between the tool and the piece to be cut.

The expansion generated by the said heat, sensitive in particular along the longitudinal axis of the bedplate, is the cause of an increase in the distance, measured in a direction perpendicular to the axis of rotation of the piece to be cut, the axis of rotation of the tool is apart from the axis of rotation of the piece to be cut, and therefore, during the time the machine is in operation, of gears being produced with dimensional characteristics that are not rigorously constant.

In order to overcome the said problem that seriously limits the precision of the said gear cutters, in the known art resort is made to various systems.

With one of the said systems, the errors resulting from the said expansion are corrected manually. To be more precise, at least until the time when the temperature has reached a stability value, the operator carries out a check on the characteristic dimensions of the gears produced.

Should the said dimensions not be in conformity with the predetermined values, the block is registered on the bedplate in such a way as to restore the correct distance in between the axes of the tool and of the piece to be cut, through an operation that causes a considerable amount of time to be wasted.

With another of the said systems, the cutting oil passes through a circuit that comprises cooling means (a heat exchanger). The said system has, however, disadvantages both as regards the overall dimensions of the machine and the cost thereof.

SUMMARY OF THE INVENTION

The object of the invention is to overcome the problems experienced with the known art, and to do this through the construction of a hobber in which the variations in the distance, caused by the thermal expansion of the bedplate, the axis of the tool is apart from the axis of the piece to be cut, are automatically corrected.

This and other objects too are all attained by the machine according to the invention, namely a gear cutter that comprises a bedplate, a first block mounted on the said bedplate, designed to carry a tool, and a second block mounted on the said bedplate, designed to carry in an axis of rotation a piece to be cut, wherein provision is made for a device for detecting variations, due to the thermal expansion of the bedplate, in the distance the said two blocks are apart, and for drive means interlocked to the said detection device and connected to at least one of the said blocks in order to compensate continuously for the said spacing variation.

BRIEF DESCRIPTION OF THE DRAWINGS

Further characteristics and advantages of the machine according to the invention will emerge from the description that follows of one preferred but not sole embodiment, illustrated on the accompanying drawings, in which.

DESCRIPTION OF THE PREFERRED EMBODIMENT

Figure 1:
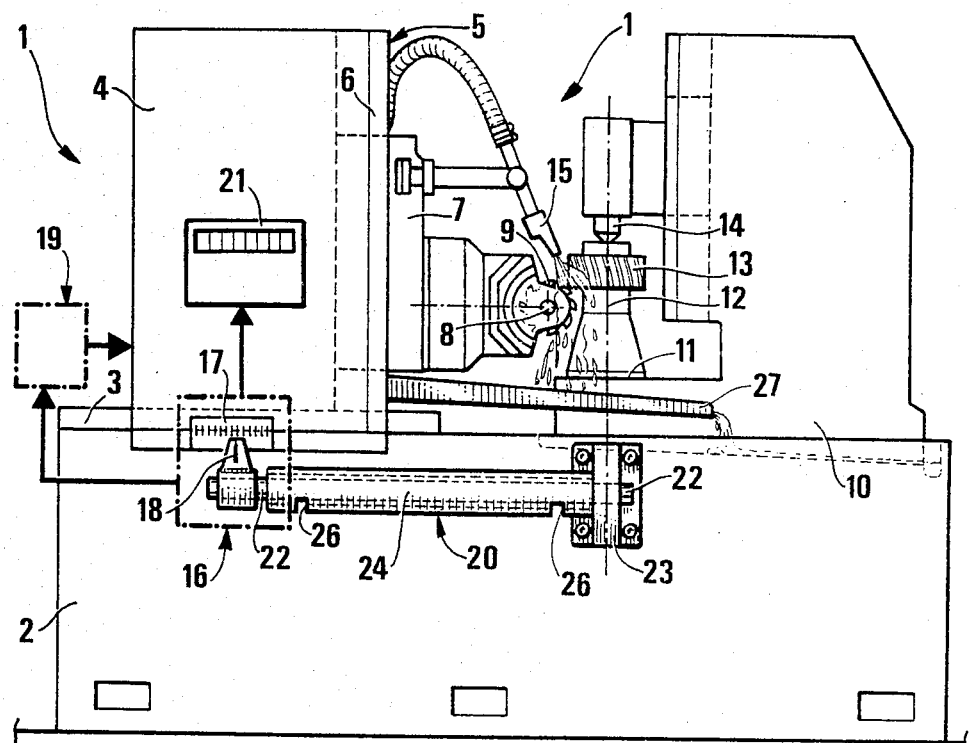
FIG. 1 shows a gear cutter constructed in accordance with the characteristics outlined herein.

With reference to FIG. 1, shown at 1 in its entirety is a hobber, of which a virtually parallelepiped bedplate shown at 2 is part.

Above the bedplate 2 are provided two guides 3 (only one of which can be seen in FIG. 1) that run in the longitudinal direction thereof, and by these is supported in a way that allows it to slide, a block or column 4 that is virtually a parallelepiped.

The column 4 is provided, in the region of one of its walls 5 perpendicular to the plane defined by the guides 3, with two vertical guides 6 (one only of which is illustrated), on which is mounted in a way whereby it is able to move smoothly thereon, a slide 7 that supports a horizontal spindle 8 perpendicular to the said guides 6. The said spindle 8 constitutes the axis of rotation of a tool or hob 9.

In a position facing the slide 7, the bedplate 2 is integral with a second block or column shown globally at 10, of which is part a rotary table 11, from which extends a vertical shaft 12 that constitutes the axis of rotation of a piece 13 destined to be transformed by the tool 9 into a gear.

A live center 14, supported by the second column 10 coaxially to the shaft 12, locks the piece 13 and ensures that it be aligned axially with the shaft 12.

At 15 is shown a nozzle and this directs a jet of cutting oil at the area of interaction in between the tool 9 and the piece 13 to be cut.

Figure 2:
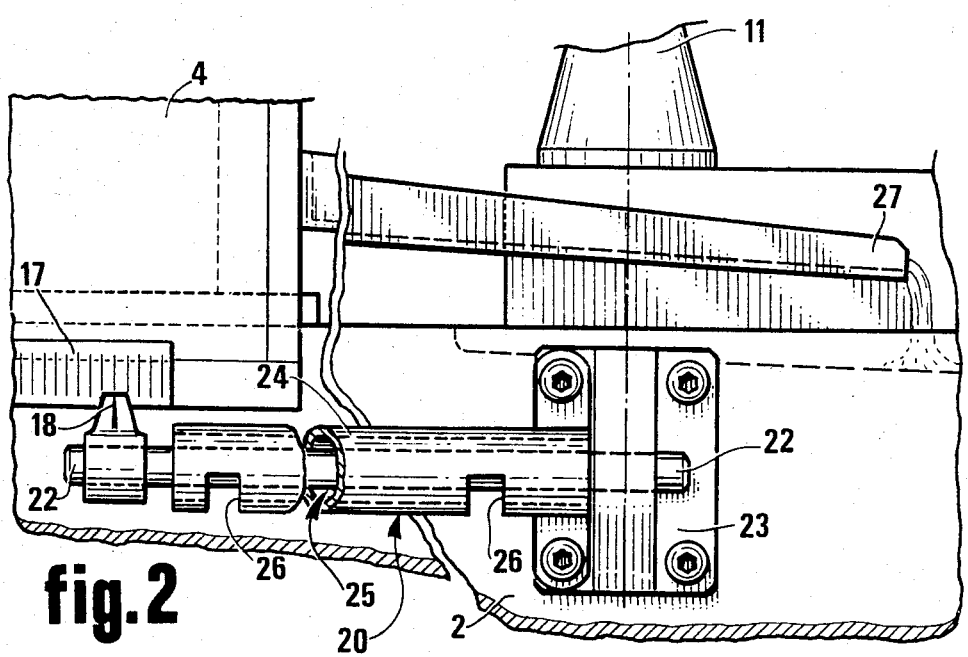
FIG. 2 shows in an enlarged scale, one detail depicted in FIG. 1.

Shown globally at 16 is a detection device constituted by a linear position transducer. The said device 16, which comprises a part constituted by a scale or reference element 17 and a part constituted by a pointer or means 18 for reading the scale 17, is able to send a control signal to a motor 19 with which to displace on the guides 3, the column 4 (see also FIG. 2). While the scale 17 is fixed directly to the column 4, the pointer 18 is secured to the bedplate by means of a connection element shown globally at 20.

The position of the pointer 18 with respect to the scale 17 is indicative of the position of the block 4 on the bedplate 2, and consequently of the distance the axis 8 of the tool 9 is apart from the axis 12 of the piece 13 to be cut.

The value of the said distance in between the axes 8 and 12 is displayed on a panel 21 to which the detection device 16 is interlocked.

The said connection element 20 is constituted by a bar 22 parallel to the guides 3, to a first extremity of which is fixed the pointer 18, and to a second extremity of which is connected, through a bracket 23, one side of the bedplate 2.

The point at which the bracket 23 is mounted is placed virtually in a plane parallel to the wall 5 that passes through the axis of rotation 12 of the piece 13.

The bar 22, which in this way passes above the section of the bedplate that is in between the axis of rotation 12 of the piece 13 and the axis of rotation 8 of the tool 9, is made of material of a very low coefficient of thermal expansion. The said material can, for example, be an alloy of iron and nickel marketed under the name of NILVAR (M. R.) which, for temperatures not above 100° C., has a linear thermal expansion coefficient of $1.5 \times 10^{-6}$.

Furthermore, the bar 22 has a mirror finish so as to oppose the absorption of heat due to radiation, and the full length thereof is protected by a tubular sheath 24.

Interposed between the bar 22 and the sheath 24 there is a chamber 25 that communicates with the outside via holes 26 that permit the circulation of air.

Immediately above the connection element 20 provision is also made for a protection screen 27 in the form of a trough, the purpose of this being to collect the cutting oil and to channel it towards a non-illustrated tank.

Let it now be assumed that after a prolonged period of inactivity, the machine 1 is required to cut gears of determinate dimensional characteristics. To the said characteristics corresponds a determinate distance in between the axis 8 of the tool 9 and the axis 12 of the piece 13 to be cut.

Thus the operator sets the position of the block 4 on the bedplate 2 in such a way that the numerical value corresponding to the said distance appears on the panel 21.

After the machine 1 has been started and once some time has elapsed, the heat generated by the parts rotating at high speed and the heat yielded by the said cutting oil cause an increase in the temperature of the bedplate 2 and, in consequence, the expansion of this, particularly along the dimension that extends the most.

The axis of rotation 8 of the tool 9 tends, therefore, to move away, in comparison with the said initial condition, from the axis of rotation 12 of the piece 13 to be cut.

The said variation in distance manifests itself by a displacement of the pointer 18 with respect to the graduated scale 17, in consequence of the fact that while the pointer 18 is practically fixed to the axis 12 of the piece 13 to be cut, the graduated scale 17 is integral with the column 4.

With the displacement of the pointer 18 with respect to the scale 17, the transducer 16 emits an error signal whereby the motor 19 is operated to move the column 4 on the guides 3 in such a way as to restore the initial spacing condition of the axes 8 and 12 or, in other words, to cancel the said error.

Naturally, with the principles of the invention remaining unchanged, it is possible to introduce numerous variants thereto.

What is claimed is

1. Gear cutting comprising
a bedplate,
a first block mounted on said bedplate,
means for carrying a tool, the tool carrying means being mounted on the first block,
a second block mounted on said bedplate,
means for carrying in an axis of rotation a piece to be cut, the piece carrying means being mounted on the second block,
a device for detecting variations, due to the thermal expansion of the bedplate, in the distance said two blocks are apart,
drive means interlocked to said detection device and connected to at least one of said blocks in order to compensate continuously for said spacing variation,
said blocks being positioned on the bedplate along the longitudinal axis thereof,
one of said blocks being mounted in a way whereby it is able to slide, in the direction of said axis, on said bedplate,
the other block being integral with said bedplate,
said detection device comprising
a reference element and
reading means for reading said reference element,
said reference element being integral with one, and said reading means with the other, of said sliding block and bedplate, whereby said reference element and reading means are movable with respect to each other as a result of thermal expansion of said bedplate.

2. Gear cutting according to claim 1 wherein said connection element is constituted by a bar fastened at one extremity to said support and sustaining, at the second extremity, one of said parts of said detection device.

3. Gear cutter according to claim 1 wherein said bar is made of material that has a thermal coefficient of expansion of substantially $1.5 \times 10^{-6}$.

4. Gear cutter according to claim 2 wherein the surface of said bar has a mirror finish.

5. Gear cutter according to claim 2 wherein means for protecting said bar against heat comprises a tubular sheath separated from said bar by an air chamber that communicates with the outside atmosphere via holes made in said sheath.

6. Gear cutter according to claim 2 further comprising a screen for protecting said bar and interposed between said bar and an area where cutting oil is delivered.

7. Gear cutter according to claim 2 wherein said bar is fixed in the region of a plane perpendicular to the longitudinal axis of said bedplate and passing through the axis of rotation of the piece to be cut, and extends parallel to said longitudinal axis.

* * * * *